United States Patent [19]

Romanowski

[11] Patent Number: 4,743,518
[45] Date of Patent: May 10, 1988

[54] CORROSION RESISTANT FUEL CELL STRUCTURE

[75] Inventor: William E. Romanowski, Rockville, Conn.

[73] Assignee: International Fuel Cells Corporation, South Windsor, Conn.

[21] Appl. No.: 21,826

[22] Filed: Mar. 4, 1987

[51] Int. Cl.$^4$ .............................................. H01M 8/04
[52] U.S. Cl. ........................................ 429/34; 429/35; 429/39
[58] Field of Search .................... 429/34, 35, 38, 39, 429/14

[56] References Cited

U.S. PATENT DOCUMENTS 4,444,851  4/1984  Mary ................................. 429/34 X
4,596,749  6/1986  Congdon et al. ................ 429/34 X Primary Examiner—Anthony Skapars
Attorney, Agent, or Firm—William W. Jones

[57] ABSTRACT

The fuel cell stack is formed with a plurality of stacked plate-like components which form serially connected fuel cells. Each fuel cell includes an electrode plate having an electrolyte reservoir and an anode on one side, a cathode on the other, and an electrolyte-saturated matrix sandwiched between the anode and cathode. The active elements of the electrode plate are mounted in a fiberglass frame which includes gas manifold portions and which forms a part of the ports which feed oxygen to the cathode side. The fiberglass frames are protected against oxygen-induced degradation and are provided with increased localized tensile strength by nickel foil which is laminated onto the fiberglass in the areas of the oxygen ports.

10 Claims, 1 Drawing Sheet

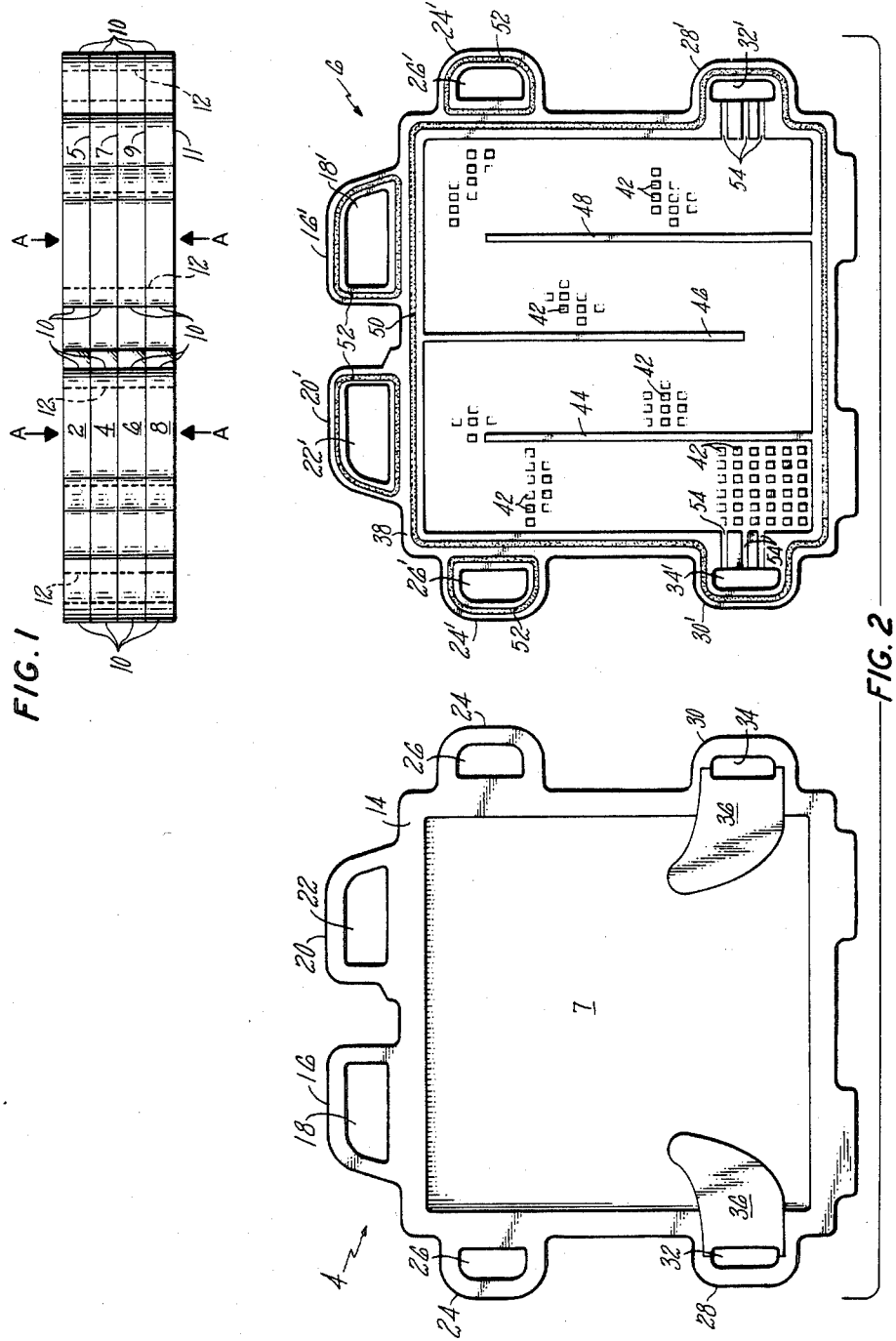

CORROSION RESISTANT FUEL CELL STRUCTURE

DESCRIPTION

TECHNICAL FIELD

This invention relates to a fuel cell structure, and more particularly, to an improved fuel cell structure wherein plugging of oxygen inlet ports by frame portions of the electrode plates is prevented.

BACKGROUND ART

Fuel cell stacks are formed from plate-like components and are stacked in repetitious fashion, one atop another. The central plate in each fuel cell in the stack is the electrode plate, which itself is a lamination of several constituent parts. The electrode plate has a first outer cathode or oxygen side part, a second outer electrolyte reservoir part with an adjacent anode or hydrogen side part, and a central matrix part sandwiched between the cathode and anode parts. The electrolyte reservoir part has several holes for hydrogen access to the anode part. The matrix is saturated with an electrolyte liquid. The electrolyte reservoir part, anode, matrix and cathode are bounded by and held together by a fiberglass frame part which includes gas manifold components that form the several manifolds needed for operation of the fuel cell. The electrode plate is itself sandwiched between two gas distribution plates, one of which provides a flow path for oxygen over the cathode, and the other of which provides a flow path for hydrogen over the anode. Each of the gas distribution plates also includes the several manifold components which conform with the aforesaid electrode plate manifold components. The outer periphery of the gas distribution plates abuts the fiberglass frame of the electrode plate, and all of the plates in the stack are tightly clamped together to seal the manifolds and the inner portions of the stack for proper operation. There are a plurality of grooves formed in each of the oxygen distribution plates which extend between each oxygen manifold part and the central oxygen flow path part of the plate. These grooves conduct high purity oxygen from the manifolds to the central flow path for distribution over the cathode. The open sides of the oxygen conducting grooves or ports is closed off by the adjacent clamped fiberglass frame portion of the electrode plate. The areas of the cathode immediately adjacent to the oxygen ports are covered by circumscribed sheets of nickel foil which prevent localized drying of the underlying matrix which would otherwise occur due to the concentration of dry oxygen flowing out of the oxygen ports. The aforesaid structure has been found to have a useful but limited life span due to ultimate clogging of the oxygen ports by a product resulting from corrosion of the fiberglass frame caused by the high purity oxygen, proximity of the KOH electrolyte, and heat generated by operation of the cells. When oxygen port clogging occurs, the cells will fail due to oxygen starvation.

DISCLOSURE OF INVENTION

This invention prevents clogging of the oxygen ports by extending the nickel foil sheets from the cathode out over the adjacent portions of the fiberglass frame. In this fashion, the portions of the fiberglass frame which overlie and close off the open side of the oxygen ports are covered with nickel foil. In this manner, the fiberglass of the frame is protected from chemically reacting with the oxygen by the nickel foil sheet. It has been found that cell stacks formed in accordance with this invention enjoy a much longer operational life and will not be prone to failure due to oxygen starvation as will the stacks of the prior art which do not employ the improvement of this invention. The nickel foil layer is tack welded to the underlying cathode, and is adhered to the fiberglass frame under heat and pressure by the fiberglass itself.

It is therefore an object of this invention to provide a fuel cell structure which exhibits a longer operational life.

It is an additional object of this invention to provide a fuel cell structure of the character described which is protected against oxygen starvation resulting from oxygen port clogging.

It is a further object of this invention to provide a fuel cell structure of the character described wherein oxygen transporting ports are prevented from clogging which can result from decomposition of the cell material.

These and other objects of the invention will become more readily apparent from the following detailed description of a preferred embodiment thereof when taken in conjunction with the accompanying drawings.

BRIEF DESCRIPTION OF THE DRAWINGS

FIG. 1 is a side elevational view of a portion of a fuel cell stack showing the plates that typically make up one component cell of the stack; and FIG. 2 is a plan view of the cathode side of the electrode plates and the oxygen circulating side of the oxygen distribution plate, shown side-by-side.

BEST MODE FOR CARRYING OUT THE INVENTION

Referring now to the drawings, there is shown in FIG. 1 the plate components of a typical cell in a stack of cells. The top plate 2 is a combination separator plate having a hydrogen circulation side and an opposite oxygen circulation side. The next plate 4 is an electrode plate having a hydrogen side or anode, and an oxygen side or cathode. For purposes of illustration, the side 5 of the plate 4 will be the hydrogen side, and the side 7 will be the oxygen side. Plate 6 is an oxygen distribution plate and plate 8 is a combination coolant distribution and hydrogen distribution plate. The coolant is distributed on the side 9 of the plate 8, and the hydrogen is distributed on the side 11 of the plate 8. The cell shown will thus be cooled from its oxygen side while the cell below it in the stack, which is not shown, will be cooled from its hydrogen side. Each of the plates 2, 4, 6 and 8 has six manifold portions denoted generally by the numeral 10, which combine to form internal gas passages 12 for transfer of the various gases and coolant along the stack to and from the individual plates which make up the cell stack. The plates constituting the stack are clamped into the arrangement shown by tie bars or some other means, so that compression is applied to the stack in the direction of the arrows A.

Referring now to FIG. 2, there is shown details of the cathode or oxygen side 7 of the electrode plate 4, and the oxygen distribution side of the plate 6. It will be understood that the sides of the plates 4 and 6 which are shown in FIG. 2 are disposed in face-to-face abutment in the cell as shown in FIG. 1.

The electrode plate 4 includes a bordering frame 14 which is formed from fiberglass and which holds the primary eletrode components together. The cathode part 7 is a gold plated nickel screen impregnated with catalyst that has contact with the central matrix, which underlies part 7. The frame 14 also includes the manifold parts which comprise a hydrogen fuel inlet manifold part 16 having an internal passage 18, and a depleted hydrogen fuel and water vapor outlet manifold part 20 having an internal passage 22. Additionally, there are a pair of coolant circulating manifold parts 24 having internal passages 26. Finally, there are two oxygen inlet manifold parts 28 and 30, each having internal passages 32 and 34 respectively. It will be understood that the cathode part 7, as well as the underlying electrode components are all secured in place within the molded fiberglass frame 14 by fiberglass laminants which are heat pressed together to form the frame. Two sheets of nickel foil 36 are adhered to the cathode plate 7 and to the fiberglass frame 14 adjacent to the oxygen inlets 32 and 34. It will be noted that the foils 36 are tack welded onto the cathode 7 and are heat sealed to the fiberglass frame 14 in a heated press during the frame molding process.

The oxygen distribution plate 6 is similar in configuration to the electrode plate 4, in that coolant manifold parts 24' with internal passages 26' are provided, as are hydrogen inlet and outlet manifold parts 16' and 20' with their respective internal passages 18' and 22'. Finally, oxygen inlet manifold parts 28' and 30' having internal passages 32' and 34' are also included on the plate 6. It will be noted that the various manifold parts and their internal passages on the plates 4 and 6 are in matching relationship. The plate 6 has a peripheral boss 28 and a central recessed portion denoted generally by the numeral 40 which forms the flow path for the oxygen. The recessed portion 40 is formed with a pluralitv of small studs 42, somewhat like a waffle iron, that serve to spread the flow of oxygen evenly over the cathode 7. There are also a plurality of ribs 44, 46 and 48 which are the same height as the peripheral boss 38 and which form connected reverse flow channels in the recessed portion 40. An elastomeric gasket 50 is mounted on the peripheral boss 38 and extends out into the oxygen manifold parts 28' and 30' to seal the joint between the plates 4 and 6. The manifolds 16', 20' and 24' are also provided with sealing gaskets 52. A plurality of grooves 54 extend between the oxygen manifold passages 32', 34' and the recessed flow portion 40 of the plate 6 so as to form oxygen inlet ports for feeding oxygen into the plate. It will be understood that during purging of the flow passage of impurities, one of the manifolds 28' and 30' will be an inlet manifold and the other an outlet; however, during normal operating periods, both are inlets.

When the plates 4 and 6 are clamped together, the grooves 54 are covered by the nickel foil sheets 36 since the latter extend across the fiberglass frame 14 all the way to the passages 32 and 34. The foil sheets 36 thus increase the tensile strength of the fiberglass frame 14 in these localized areas and also prevent the flowing oxygen from contacting the fiberglass. The increase in tensile strength is sufficient to prevent, at least locally, creeping of the fiberglass so that the latter will not deform into the grooves 54 so as to restrict or cut off flow of oxygen through the grooves 54. Additionally, by preventing contact between the oxygen and fiberglass, the foil prevents oxygen-induced corrosion of the fiberglass which would also plug the grooves 54 to restrict or cut off oxygen flow.

The foil will also prevent a second plugging reaction from occurring. The inner edge of the frame will corrode after extended direct contact with the electrolyte thus exposing the outer edge of the matrix. If the incoming stream of oxygen passes directly over the exposed matrix-electrolyte edge, the electrolyte will become a solid contaminant after extended contact with the oxygen and fiberglass. The overlying foil sheet prevents this undersirable oxygen-electrolyte contact from occurring.

It will be readily appreciated that the improved structure of this invention will provide extended, useful life for the fuel cell stacks in a simple and economical manner. The noncorrosiveness of the nickel foil in the fuel cell environment ensures that the oxygen ports will not be plugged by cell structure corrosion, and the tensile strength of the nickel foil prevents creep or deformational plugging of the oxygen ports by the fiberglass.

Since many changes and variations of the disclosed embodiment of the invention may be made without departing from the inventive concept, it is not intended to limit the invention otherwise than as required by the appended claims.

I claim:

1. A fuel cell comprising:
   (a) an oxygen distribution plate having a central recessed oxygen flow path portion surrounded by a peripheral raised boss, said boss having at least one oxygen inlet groove formed therein for transfer of oxygen across said boss and into said oxygen flow path portion;
   (b) an electrode plate having a central cathode part surrounded by a peripheral frame formed from a material which will corrode with continued exposure to high purity oxygen, said distribution plate and said electrode plate being disposed in contiguous relationship with said boss abutting said frame and said oxygen flow path portion overlying said cathode part;
   (c) means forming an oxygen manifold for distributing oxygen to said oxygen inlet groove; and
   (d) protective means sandwiched between said boss and said frame operable to prevent oxygen flowing through said oxygen inlet groove from contacting said material forming said frame.

2. The fuel cell of claim 1 wherein said protective means is a layer of corrosion resistant foil.

3. The fuel cell of claim 1 wherein said frame is formed from fiberglass.

4. The fuel cell of claim 1 wherein said oxygen manifold is formed integral with said plates.

5. A fuel cell stack comprising:
   (a) an oxygen distribution plate having a central oxygen flow path portion surrounded by a peripheral sealing portion including a raised boss, said boss having at least one oxygen inlet groove extending thereacross for transferring oxygen to said oxygen flow path portion;
   (b) an electrode plate having a central cathode part disposed opposite said oxygen flow path portion of said distribution plate, and a peripheral frame disposed opposite said peripheral sealing portion, said plates being compressively held in opposed relationship with a portion of said frame overlying said oxygen inlet groove; and (c) sheet means sandwiched between said oxygen inlet groove and said portion of said frame overlying said oxygen inlet groove to strengthen said frame and prevent compressive creep of said frame into said oxygen inlet groove whereby the latter remains open for transfer of oxygen.

6. The fuel cell stack of claim 5 wherein said frame is formed from fiberglass and said sheet means is a sheet of nickel foil which also protects said frame from corrosive contact with oxygen flowing through said oxygen inlet groove.

7. The fuel cell stack of claim 6 further comprising manifold means integral with said plates for distributing high purity oxygen to said oxygen inlet groove, said manifold means having an oxygen passage, and said nickel foil sheet extending up to an edge of said oxygen passage.

8. A fuel cell stack comprising:
(a) an oxygen distribution plate having a central oxygen flow path portion surrounded by a peripheral sealing portion including a raised boss, said boss having a plurality of oxygen inlet grooves extending thereacross for transferring oxygen to said oxygen flow path portion;
(b) an electrode plate having a central oxygen electrode part disposed opoosite said oxygen flow path portion, and a peripheral fiberglass frame disposed opposite said peripheral sealing portion; and
(c) a sheet of nickel foil sandwiched between said peripheral sealing portion of said distribution plate and said fiberglass frame, said foil overlying said oxygen inlet grooves so as to prevent oxygen flowing through said inlet grooves from contacting said fiberglass frame.

9. The fuel cell stack of claim 8 further comprising at least one oxygen manifold formed integrally with said plates, said oxygen manifold having internal passages for distribution of oxygen to said oxygen inlet grooves.

10. The fuel cell stack of claim 9 wherein said foil is adhered to said fiberglass frame and extends from said oxygen electrode part to an edge of said oxygen manifold internal passage.

* * * * *